US011399267B2

(12) United States Patent
Natwick (10) Patent No.: US 11,399,267 B2
(45) Date of Patent: Jul. 26, 2022

(54) ARCHITECTURE FOR DEFINING A PRIVATE/PRIORITY NETWORK FOR COMMUNICATION ON AN AIRCRAFT

(71) Applicant: SMARTSKY NETWORKS LLC, Morrisville, NC (US)

(72) Inventor: Jason Natwick, Melbourne, FL (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

(21) Appl. No.: 17/055,184

(22) PCT Filed: May 14, 2019

(86) PCT No.: PCT/US2019/032093
§ 371 (c)(1),
(2) Date: Nov. 13, 2020

(87) PCT Pub. No.: WO2019/222133
PCT Pub. Date: Nov. 21, 2019

(65) Prior Publication Data
US 2021/0227363 A1   Jul. 22, 2021

Related U.S. Application Data

(60) Provisional application No. 62/671,239, filed on May 14, 2018.

(51) Int. Cl.
*H04W 72/04* (2009.01)
*H04W 4/42* (2018.01)
(Continued)

(52) U.S. Cl.
CPC ......... *H04W 4/42* (2018.02); *H04W 72/0453* (2013.01); *H04W 72/10* (2013.01); *H04W 74/00* (2013.01)

(58) Field of Classification Search
None
See application file for complete search history.

(56) References Cited

U.S. PATENT DOCUMENTS

| 6,052,604 A * | 4/2000 | Bishop, Jr. .......... H04W 12/068 455/558 |
| 8,401,021 B2 * | 3/2013 | Buga ...................... H04L 67/12 370/395.42 |

(Continued)

OTHER PUBLICATIONS

International Search Report and Written Opinion from related international application PCT/US2019/032093, dated Jul. 19, 2019, all pages cited in its entirety.

*Primary Examiner* — Kodzovi Acolatse
(74) *Attorney, Agent, or Firm* — Burr & Forman LLP (57) ABSTRACT

An aviation-related communication network includes a plurality of base stations configured to communicate with in-flight aircraft, a plurality of aviation-related communication network radios disposed on selected aircraft where the aviation-related communication network radios are configured to communicate with base stations of the aviation-related communication network via aviation-related communication network communication links using a first communication standard, and a first wireless access point on each of the selected aircraft to define a first wireless local area network on each of the selected aircraft. At least some of the selected aircraft include a second wireless local area network that defines a priority access network. Devices of the priority access network may be provided with priority access to bandwidth supplied by the aviation-related communication network relative to devices of the first wireless local area network.

18 Claims, 5 Drawing Sheets

(51) Int. Cl.
  *H04W 72/10*  (2009.01)
  *H04W 74/00*  (2009.01)

(56) References Cited

U.S. PATENT DOCUMENTS

| | | | |
|---|---|---|---|
| 2012/0236784 A1* | 9/2012 | Lynch | H04W 72/042 |
| | | | 370/316 |
| 2014/0105061 A1* | 4/2014 | Kannan | H04W 48/20 |
| | | | 370/254 |
| 2014/0282684 A1* | 9/2014 | Keen | H04N 21/422 |
| | | | 725/30 |
| 2015/0245309 A1* | 8/2015 | Nayak | H04W 8/183 |
| | | | 455/435.3 |
| 2016/0119052 A1* | 4/2016 | Frerking | H04B 7/18506 |
| | | | 455/431 |
| 2016/0119914 A1* | 4/2016 | Oizumi | H04W 16/14 |
| | | | 370/329 |
| 2016/0119938 A1* | 4/2016 | Frerking | H04B 7/1851 |
| | | | 370/316 |
| 2016/0140844 A1* | 5/2016 | Njihia | G06Q 40/08 |
| | | | 340/989 |
| 2016/0157075 A1* | 6/2016 | Ho | H04W 4/90 |
| | | | 455/404.2 |
| 2016/0212694 A1* | 7/2016 | Lindoff | H04W 48/18 |
| 2017/0025023 A1* | 1/2017 | Goddemeier | G08G 5/0095 |
| 2018/0247544 A1* | 8/2018 | Mustafic | G08G 5/0039 |
| 2020/0186237 A1* | 6/2020 | Karlsson | H04W 84/06 |
| 2020/0373998 A1* | 11/2020 | Nordlow | H04B 7/18506 |

* cited by examiner

ARCHITECTURE FOR DEFINING A PRIVATE/PRIORITY NETWORK FOR COMMUNICATION ON AN AIRCRAFT

CROSS REFERENCE TO RELATED APPLICATIONS

This application claims priority to U.S. application No. 62/671,239 filed May 14, 2018, the entire contents of which are hereby incorporated by reference in its entirety.

TECHNICAL FIELD

Example embodiments generally relate to wireless communications and, more particularly, relate to techniques for enabling the provision of a private or priority network over the top of an existing communication network in an aviation context.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people have generally understood that easy and/or cheap connectivity would tend to stop once an aircraft is boarded. That said, aviation platforms are becoming more easily and cheaply connected to communication networks for the passengers and crew onboard. While the ability to stay connected in the air improves, and cost and bandwidth limitations are also reduced, it remains true that the most common and cost effective solutions currently available tend to have high latency problems. As such, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, additional communication paradigms may become available beyond the familiar communication paradigm of enabling passengers on board the aircraft to receive service via a Wi-Fi router on board the aircraft. When such improvements are implemented, not only can user equipment be more readily connected to communication links off the aircraft, but devices on the aircraft itself can also have seamless connectivity to networks off the aircraft to the point where nearly every device on the aircraft (including those that are part of the aircraft and those that are only aboard for a single flight) can have connectivity. However, even when such access to connectivity becomes available, issues may still exist regarding how to prioritize access to the communication links.

BRIEF SUMMARY OF SOME EXAMPLES

The continuous advancement of wireless technologies offers new opportunities to provide wireless communication to devices located on an aircraft. In this regard, for example, a private or priority network may be defined over the top of an existing aviation-related communication network to ensure that the devices/members of the private or priority network have uninterrupted and un-delayed access available bandwidth by enabling some devices on the aircraft to have priority access to network resources.

In one example embodiment, an aviation-related communication network is provided. The aviation-related communication network includes a plurality of base stations configured to communicate with in-flight aircraft, a plurality of aviation-related communication network radios disposed on selected aircraft where the aviation-related communication network radios are configured to communicate with base stations of the aviation-related communication network via first communication links using a first communication standard, and a first wireless access point on each of the selected aircraft to define a first wireless local area network on each of the selected aircraft. At least some of the selected aircraft include a second wireless local area network that defines a priority access network. Devices of the priority access network may be provided with priority access to bandwidth supplied by the aviation-related communication network relative to devices of the first wireless local area network.

In another example embodiment, a priority access network is provided. The priority access network may be operable on an aircraft separate from, but using resources of, an aviation-related communication network. The aviation-related communication network may include a plurality of base stations configured to communicate with in-flight aircraft including the aircraft, and a plurality of aviation-related communication network radios disposed on selected aircraft including the aircraft. The aviation-related communication network radios may be configured to communicate with base stations of the aviation-related communication network via aviation-related communication network communication links using a first communication standard. The aviation-related communication network radios may further be configured to interface with devices forming a first wireless local area network on the aircraft bandwidth supplied by the aviation-related communication network. The priority access network may include a first wireless access point and a plurality of devices configured to define a second wireless local area network on the aircraft. The devices of the priority access network may have priority access to the bandwidth supplied by the aviation-related communication network relative to devices of the first wireless local area network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide architectures and methods for improved aviation-related communication network (e.g., satellite network, air-to-ground (ATG) network, or hybrid network) wireless communication performance. In this regard, some example embodiments may provide the ability to define a priority access or private network that operates within the context of aviation-related network communication. Such a priority access or private network, which may act as a virtual network, could be used to provide access to certain resources on a particular platform independent of the other aviation-related communication network resources on the particular platform, or at least independent of the wireless access point that serves other passengers and equipment on the particular platform. Thus, for example, the priority access or private network may provide an architecture for creating a network that can provide aviation-related communication network access for critical onboard functions or equipment to create an internet-of-things (TOT) environment onboard the aircraft that has priority access to communications to and from the ground. However, it should be appreciated that the concepts described herein may also allow other uses for the private network as well. Thus, the descriptions herein relating to practicing example embodiments are not limiting to other contexts in which example embodiments may be applicable.

Figure 1:
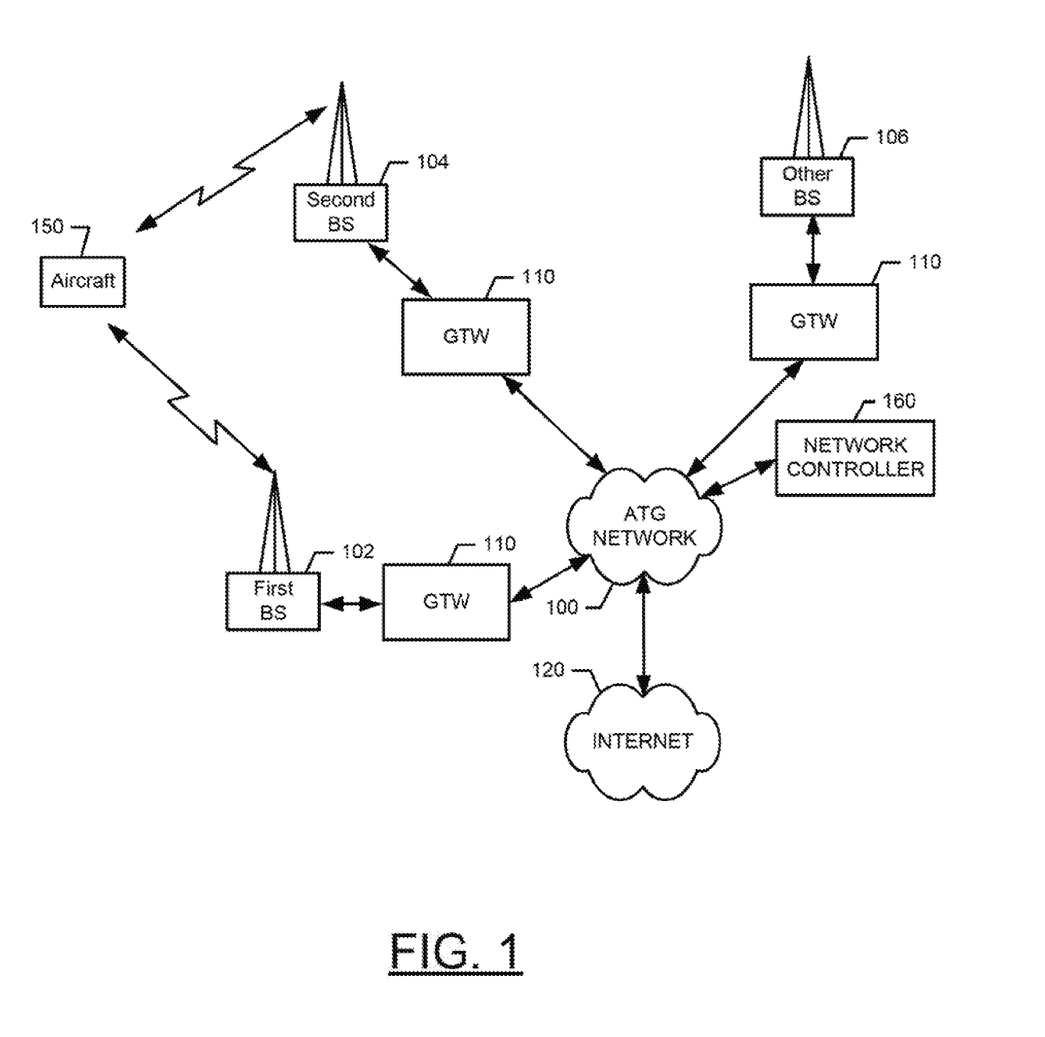
FIG. 1 illustrates a block diagram of an ATG network as one example of an aviation-related communication network in accordance with an example embodiment.

FIG. 1 illustrates a functional block diagram of an ATG network 100 that may employ an example embodiment. However, it should be appreciated that the ATG network 100 of FIG. 1 is merely one example of an aviation-related communication network of an example embodiment. Thus, the ATG network 100 could be substituted with a satellite communication network or a hybrid network that includes ATG and satellite components, or any other aviation-related communication networks. As shown in FIG. 1, a first BS 102 and a second BS 104 may each be base stations of the ATG network 100. The ATG network 100 may further include other BSs 106, and each of the BSs may be in communication with the ATG network 100 via a gateway (GTW) device 110. The ATG network 100 may further be in communication with a wide area network such as the Internet 120 or other communication networks. In some embodiments, the ATG network 100 may include or otherwise be coupled to a packet-switched core network. It should also be understood that the first BS 102, the second BS 104 and any of the other BSs 106 may be either examples of base stations employing antennas configured to communicate via network frequencies and protocols defined for the ATG network 100 with ATG radio equipment provided on an aircraft 150. The aircraft 150 may be in-flight and may move between coverage areas (defined in 3D space above the surface of the earth) that are associated with respective ones of the first BS 102, the second BS 104 and other BSs 106. These coverage areas may overlap such that continuous coverage can be defined and the aircraft 150 can sequentially communicate with various ones of the BSs as the aircraft 150 travels via handovers. In some cases, handovers of receivers on aircraft may be accomplished under the control of a network component such as network controller 160.

Although the network controller 160 is shown as being operably coupled to the ATG network 100 directly in FIG. 1, it should be appreciated that the network controller 160 could be located anywhere in the ATG network 100, and may even be a collection of distributed components in some cases. The network controller 160 that may include, for example, switching functionality. Thus, for example, the network controller 160 may be configured to handle routing calls to and from the aircraft 150 (or to communication equipment on the aircraft 150) and/or handle other data or communication transfers between the communication equipment on the aircraft 150 and the ATG network 100. In some embodiments, the network controller 160 may function to provide a connection to landline trunks when the communication equipment on the aircraft 150 is involved in a call. In addition, the network controller 160 may be configured for controlling the forwarding of messages and/or data to and from communication equipment on the aircraft 150, and may also control the forwarding of messages for the base stations. It should be noted that although the network controller 160 is shown in the system of FIG. 1, the network controller 160 is merely an exemplary network device and example embodiments are not limited to use in a network employing the network controller 160.

The network controller 160 may be coupled to a data network, such as a local area network (LAN), a metropolitan area network (MAN), and/or a wide area network (WAN) (e.g., the Internet 120) and may be directly or indirectly coupled to the data network. In turn, devices such as processing elements (e.g., personal computers, laptop computers, smartphones, server computers or the like) can be coupled to the communication equipment on the aircraft 150 via the Internet 120.

Although not every element of every possible embodiment of the ATG network 100 is shown and described herein, it should be appreciated that the communication equipment on the aircraft 150 may be coupled to one or more of any of a number of different networks through the ATG network 100. In this regard, the network(s) can be capable of supporting communication in accordance with any one or more of a number of first-generation (1G), second-generation (2G), third-generation (3G), fourth-generation (4G), fifth generation (5G), and/or future mobile communication protocols or the like. In some cases, the communication supported may employ communication links defined using unlicensed band frequencies such as 2.4 GHz or 5.8 GHz. Example embodiments may employ time division duplex (TDD), frequency division duplex (FDD), or any other suitable mechanisms for enabling two way communication (to and from the aircraft 150) within the system. Moreover, in some cases, this communication may be accomplished, and one or both of the links associated therewith may be formed, via narrow radio frequency beams that are formed or otherwise resolved by the antenna assemblies associated with the aircraft 150 and/or the base stations (102, 104, 106). As such, beamforming technology may be used to define one or both of the uplink to the aircraft 150 and the downlink from the aircraft 150.

In some embodiments, one or more instances of a beamforming control module may be employed on wireless communication equipment at either or both of the network side or the aircraft side in example embodiments. Thus, in some embodiments, the beamforming control module may be implemented in a receiving station on the aircraft 150 (e.g., a passenger device or device associated with the aircraft's communication system (e.g., a Wi-Fi router)). In some embodiments, the beamforming control module may be implemented in the network controller 160 or at some other network-side entity. The beamforming control module may be configured to utilize location information (e.g., indicative of a relative location of the aircraft 150 from one of the base stations) to steer or form a narrow beam toward the target (e.g., the aircraft 150) from the transmitting entity (e.g., the first B S 102). The narrow beam may then reach the target (e.g., the aircraft 150) at an angle of arrival (in 3D space) determined by the relative location. Thereafter, continuous tracking of the aircraft 150 may occur and subsequent beam formation or steering may occur to ensure that the aircraft 150 continues to be capable of continuous and uninterrupted communication with assets on the ground via the ATG network 100.

Figure 2A:
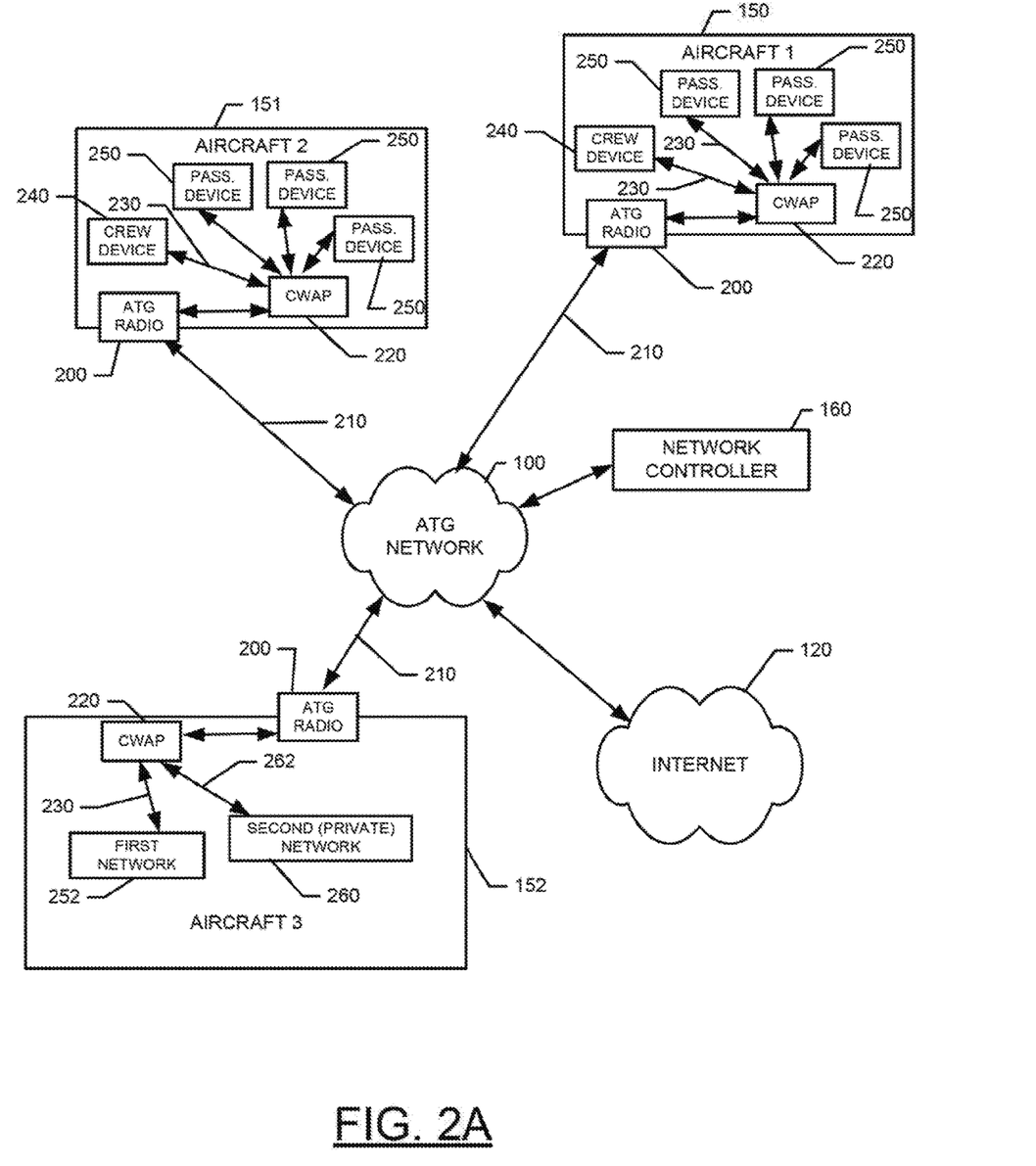
FIG. 2A illustrates a block diagram of various devices on aircraft connecting to the ATG network in accordance with an example embodiment.

The system of FIG. 1 may support communication (i.e., via the base stations (102, 104, 106)) between the ATG network 100 and a plurality of aircraft, each of which may have a plurality of communication devices thereon. FIG. 2A illustrates a block diagram of a communication paradigm associated with serving individual communication devices on multiple aircraft via the ATG network 100. As shown in FIG. 2A, the ATG network 100 may communicate with multiple aircraft (e.g., aircraft 150, 151 and 152) via the base stations of FIG. 1. As such, the antenna assembly on each of the base stations may form respective beams to serve each of the aircraft 150, 151 and 152. In particular, the beams may be received at individual instances of an ATG radio 200 provided at each respective one of the aircraft 150, 151 and 152. Thus, each of the ATG radios 200 may be directly connected to the ATG network 100 via a long distance, ATG network link 210 (which is an example of a first network or aviation-related communication network link more generally) associated with formation of the beams as described above.

Each of the ATG radios 200 is provisioned or otherwise configured to be able to communicate on the ATG network 100. In some cases, a subscriber identity module (SIM) card may be provided in order to securely store subscriber identity information (e.g., an international mobile subscriber identity (IMSI) number) and corresponding keys that enable identification and authentication of the ATG radio 200 as an authorized subscriber for the ATG network 100. As such, the SIM card, which may be an integrated circuit specific to the ATG network 100, may function as a universal integrated circuit card (UICC) that includes unique information for enabling the ATG radio 200 to operate on the ATG network 100. Thus, the SIM card used by each of the ATG radios 200 may be referred to as an ATG SIM card, and is an example of an aviation-related communication network SIM card more generally.

In an example embodiment, the ATG radio 200 may be operably coupled to a cabin wireless access point (CWAP) 220 that is further configured to wirelessly communicate with various devices onboard the aircraft 150, 151 and 152 via short range links 230. The various devices may include, for example, crew devices 240 and passenger devices 250. The crew devices 240 may include tablets, laptops, smartphones, etc., of the crew, but may also include avionics equipment or other aviation related equipment used by the crew to facilitate flight operations or otherwise supportive of the aircraft 150, 151 and 152 and/or the mission or tasking assigned to the aircraft 150, 151 and 152. The passenger devices 250 may include tablets, laptops, smartphones, etc., of the passengers, but may also include any other personal communication devices or communication devices that are associated with the aircraft 150, 151 and 152 and accessible by or associated with the passengers.

In some examples, the ATG network link 210 may be a 4G Long-Term Evolution (LTE) (or 5G) link that operates in accordance with the LTE standard. Meanwhile, the short range links 230 may employ Wi-Fi or any other communication protocol that is suitable for handling communication on the aircraft 150, 151 and 152. Thus, the CWAP 220 communicates via the short range links 230, which use different communication protocols, frequencies and/or the like than the ATG network links 210 in order to avoid any interference therebetween. Each of the short range links 230 may be used to serve content to respective ones of the various devices based on the requests made by passengers or crew at the various devices. Accordingly, via the CWAP 220, the bandwidth provided by the ATG network link 210 may be divided amongst the various devices on the aircraft 150, 151 and 152. Some CWAP's 220 may be configured to handle over 100 users (e.g., 150 to 200) at a time. Thus, it should be appreciated that individual user link bandwidths may be relatively limited during high use. scenarios.

To the extent that individual ones of the passenger devices 250 or the crew devices 240 are engaged in applications or services that require prioritized bandwidth allocations, the CWAP 220 may employ bandwidth allocation protocols that prioritize such allocations. In some embodiments, other equipment may be tasked with such allocations or the prioritizations may be built into the protocols employed by various components of the system. However, in each case, bandwidth of the ATG network link 210 may be divided to serve each of the various devices by the CWAP 220 such that as the number of users increases (e.g., the number of passenger devices 250 plus crew devices 240), the average bandwidth per user decreases. For certain critical functions associated with avionics equipment or task/mission critical communications, sacrifices in available bandwidth due to the number of users may be undesirable at best, or may impact task/mission accomplishment. In order to provide bandwidth and/or quality of service guarantees for such equipment, some example embodiments may define a private network that may utilize resources of the ATG network 100 to improve service. Such a private network (or an example thereof) is shown on the third aircraft 152 in the example of FIG. 2.

In this regard, the crew devices 240 and/or passenger devices 250 may combine to form devices or members of a first network 252 (or first on-board network). The short range links 230 to these devices may operate in accordance with a common protocol to form a wireless local area network (WLAN). Thus, the first network 252 could alternatively be referred to as a first WLAN on-board the aircraft, and the first network 252 is served via the CWAP 220. However, the CWAP 220 may also be configured to serve a second (private) network 260 (or second (private) WLAN) via private network short range links 262. The private network short range links 262 may be formed using a similar (or the same) protocol used to form the first WLAN. However, the private network short range links 262 may, for example, be formed using a different frequency band. In this regard, for example, the first WLAN could employ one of 2.4, 3.6. 5 or 60 GHz bands, and the second (private) WLAN may employ a different one of such bands.

Figure 2B:
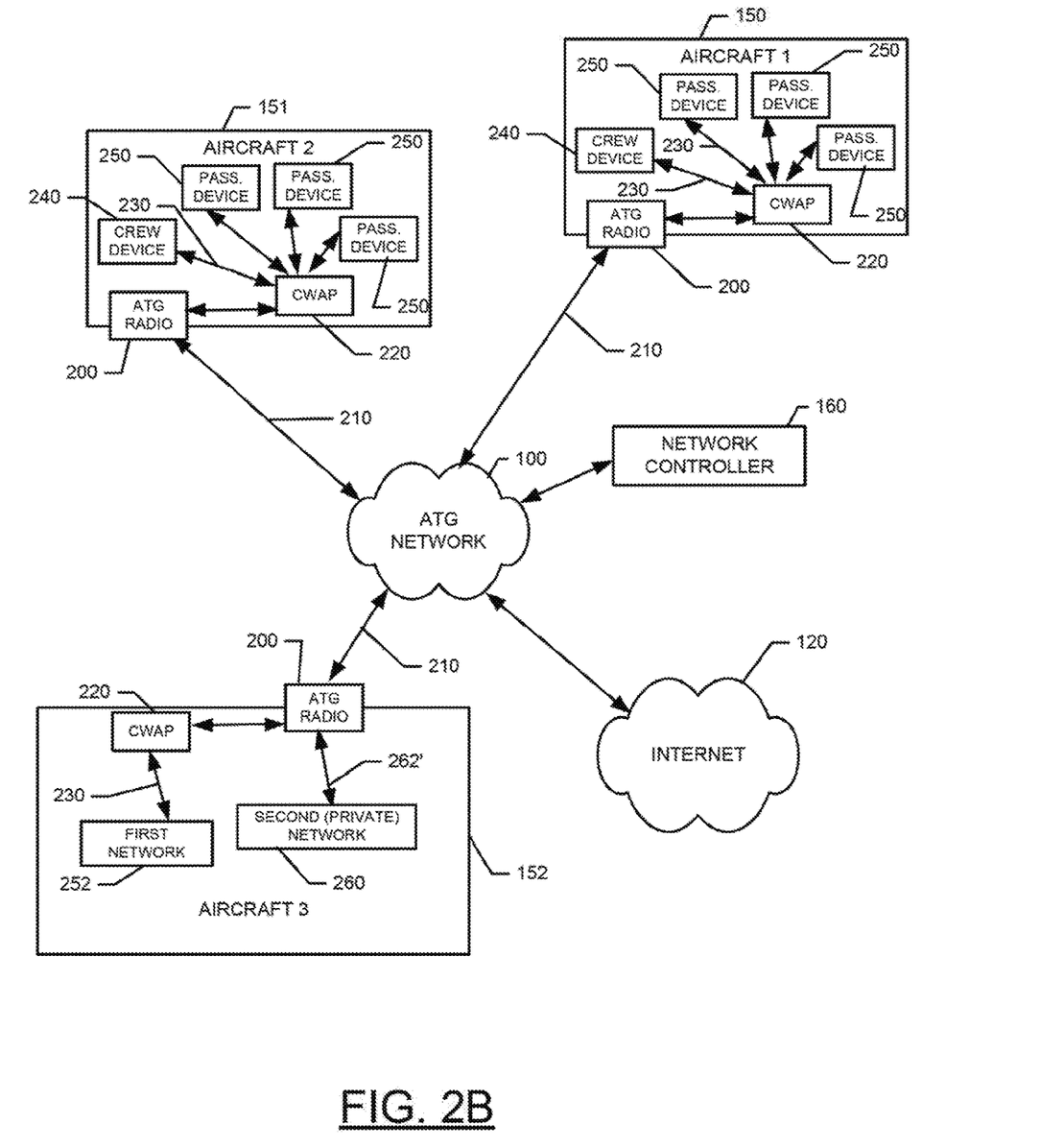
FIG. 2B illustrates an alternative structure to that of FIG. 2A in which the private network is directly coupled to the ATG radio.
Figure 3:
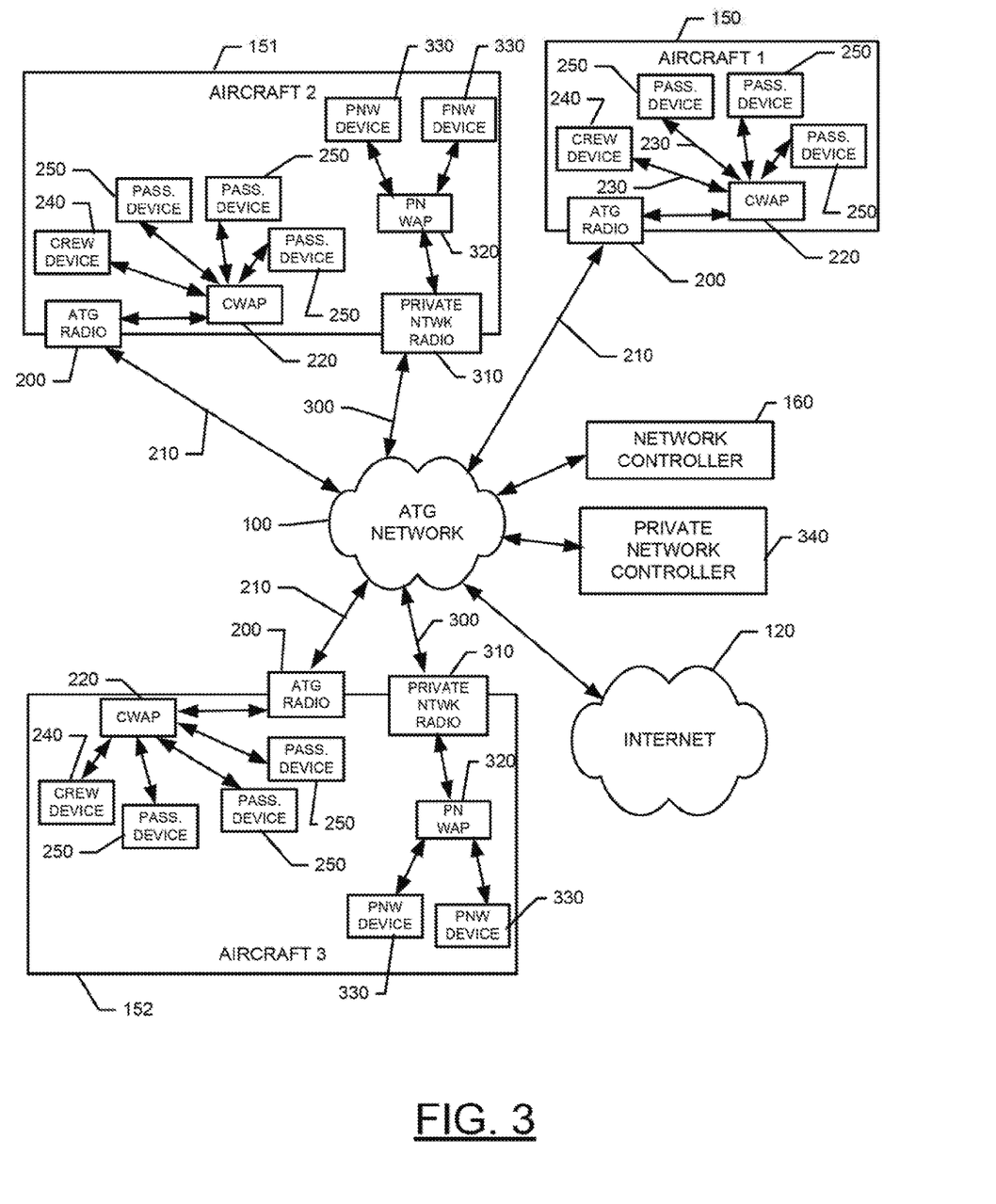
FIG. 3 illustrates a functional block diagram of some components of a virtual private network being added to the ATG network in accordance with an example embodiment.

The devices of the second (private) network 260 may be avionics equipment or other on-board equipment in some cases that require priority access to network resources. However, such devices could be crew devices or passenger devices that are offered priority access for any reason in some cases as well. Regardless of the makeup of the devices that form the second (private) network, the total bandwidth that is provided via the ATG network link 210 to the CWAP 220 will be divided amongst the first network 252 and the second (private) network 260 with the private network receiving priority over any and all devices of the first network 252. Thus, an IOT environment of high priority devices could be created and given priority access to network resources using the same CWAP that non-priority devices use on an aircraft. Although this example provides an architecture for using a single CWAP to create effectively two separate WLANs (one with priority access and one without), it is also possible to create such separate WLANs using separate CWAPs or even no additional CWAP as will be discussed in some examples that follow. In this regard, it is also possible for the second (private) network 260 to operate via private network short range links 262' that originate at the ATG radio 200 instead of passing through the CWAP 220 or any such access point. FIG. 2B illustrates such an example, in the example of FIG. 2B, the second (private) network 260 may be an LTE private network. Thus, there may be a separate LTE network on the plane that has priority access to the ATG network link 210 resources. As such, aircraft equipment (e.g., as an IOT, connected set of devices) may have direct or priority access to the ATG network links 210. Priority access may be defined in accordance with LTE standards for the IOT connected devices without any connection through an access point other than the radio through which the connection to terrestrial networks is maintained. FIG. 3 illustrates a block diagram of another architecture for supporting a private network in accordance with an example embodiment.

Referring now to FIG. 3, the aircraft 150, 151 and 152 may each have substantially the same capabilities described above. However, in addition to devices that connect to the ATG network 100 via the ATG network links 210, a private network link 300 may be provided to serve one or more private network radios 310 disposed on one or more of the aircraft (in this example, aircraft 151 and 152). The private network link 300 is an example of a priority access link more generally, and the private network radios 310 are examples of priority access radios. The private network radios 310 may utilize the same wireless network infrastructure as the ATG radios 200. In other words, both the private network radios 310 and the ATG radios 200 may operate over the ATG network 100. However, the private network radios 310 may be associated with an IOT-type grouping of devices on the aircraft 150 that have separately defined access mechanisms from those of the main or primary network path of the ATG network 100. In this regard, the private network links 300 may conform to protocols associated with communication via the ATG network 100, and may use essentially the same network services (e.g., 4G LTE standard communication links) as the ATG network links 210. However, the private network links 300 may be formed using devices having a unique set of identities, codes, keys, and/or the like, which maintain the communications via the private network links 300 distinct from the ATG network links 210 even though the same network architecture is employed to support such links. As such, for example, each of the private network radios 310 may be provisioned or otherwise configured to be able to communicate on the ATG network 100 via links that are separate from the ATG network links 210. In some cases, a private network SIM card may be provided in order to securely store subscriber identity information (e.g., IMSIs) and corresponding keys that enable identification and authentication of the private network radios 310 authorized subscribers for the ATG network 100. As such, the private network SIM card, which may be an integrated circuit specific to the ATG network 100, may function as the UICC that includes unique information for enabling the private network radios 310 to operate on the ATG network 100. Thus, the private network SIM cards used by each of the private network radios 310 may be distinct and create a virtual network over the top of the existing network on the ATG network that operates using the ATG SIM cards.

In some cases, the virtual private network may include multiple devices on the aircraft 151 and 152. In such cases, the devices could be wirelessly connected to the private network radios 310 via a private network wireless access point (WAP) 320. The private network WAP 320 may operate similarly to the CWAP 220, except that the private network WAP 320 may use different channels or frequencies to avoid any interference with the CWAP 220 to communicate with private network devices 330. The private network devices 330 may include avionics equipment (e.g., engine monitoring equipment, weather reporting equipment, electronic flight data recording equipment, navigation equipment, etc.) or other task/mission critical devices for which it is either desirable or necessary to avoid reductions in bandwidth that could come from splitting bandwidth many ways. This group of avionics equipment devices may form an IOT-type group of devices that can have priority access to providing data to the ground, and/or have priority access to receiving data from the ground to enhance the safety, security or other critical capabilities of the avionics equipment. However, in some cases, private network subscribers could include passengers or crew that desire and/or are granted priority access to the ATG network 100 via the virtual private network (i.e., a priority access network). Thus, for example, devices associated with crew members, and/or devices associated with passengers that have earned, or been awarded, priority access may have access to the virtual private network via the private network radios 310 by being given credentials to access the ATG network 100 via the private network WAP 320. Moreover, in some cases, different private network devices 330 may themselves be associated with classes that allow, in the case of emergency or other events, access to the ATG network 100 to be dynamically adjusted so that, for example, if damage or other activities that limit the bandwidth available for communication over the ATG network 100, such available bandwidth is allocated to the highest priority classes in a dynamic fashion. In such an example, the private network WAP 320 may have an access code or login credentials that are only given to specific individuals with devices authorized to access the virtual private network according to their respective priority class. In some cases, a private network controller 340 may be in communication with the ATG network 100 to manage aspects of the virtual private network in parallel with the network controller 160. The private network controller 340 may be configured, for example, to issue credentials to private network devices 330 (sometimes via the non-private side of the ATG network 100) to access the virtual private network by connecting to the private network WAP 320. Thus, in the example of FIG. 3, user equipment or end user devices that access the virtual private network need not themselves have the private network SIM card. Instead, such devices can access the virtual private network formed by the private network radios 310 and the private network links 300 via the private network WAP 320. Effectively, the private network radios 310 form a virtual private network or priority access network that uses the same resources as the ATG radios 200, but can be operated separately from the ATG radios 200. As such, for example, the virtual private network that is formed may be operated similar to a virtual mobile network operator (VMNO).

Figure 4:
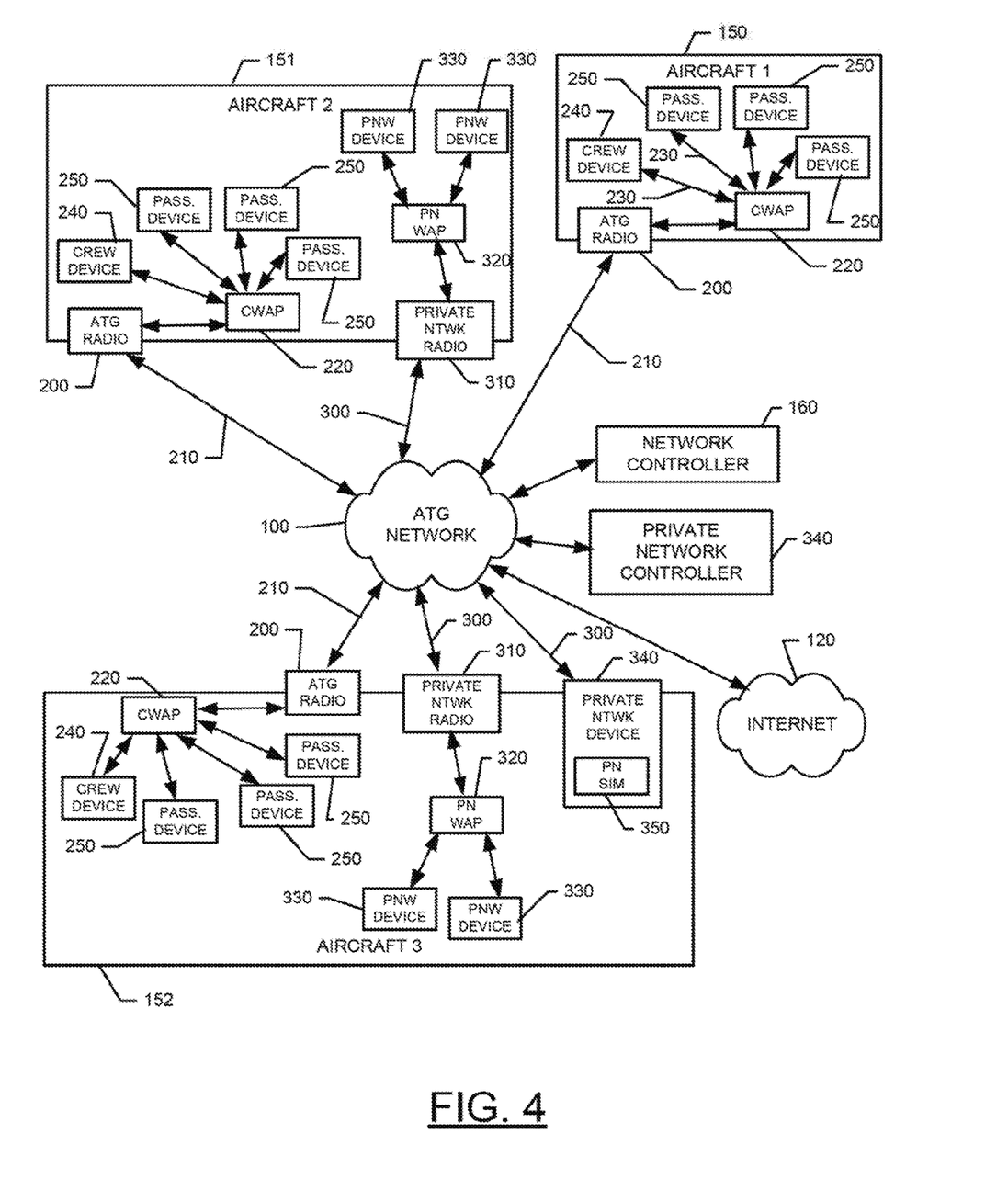
FIG. 4 illustrates a block diagram of two different communication paradigms for the virtual private network in accordance with an example embodiment.

In the communication paradigm of the example of FIG. 3, a small number of devices (e.g., only the private network radios 310) may actually have the private network SIM card. Most devices that access the virtual private network may achieve access via Wi-Fi or another short range communication link from the private network WAP 320. However, in other cases, it may be desirable for certain private network devices to be directly provisioned with private network SIM cards that permit access to the ATG network 100 for such devices without any requirement for connection to any WAP. FIG. 4 illustrates one such example.

Referring now to FIG. 4, the examples of FIGS. 2 and 3 may be practiced on one or more of the aircraft, while one or more of the aircraft (i.e., aircraft 152 in this example) employ at least one private network device 340 that has direct access to the virtual private network. Of note, although FIG. 4 shows only one private network device 340 that has direct access to the virtual private network, it should be appreciated that any number of private network devices 340 having direct access to the virtual private network may be provided on any number of aircraft. Moreover, one or more of the aircraft 150, 151 and 152 could include one or more of the private network devices 340 that directly access the virtual private network with or without any instances of the CWAP 220 and/or the private network WAP 320 also being provided onboard. As noted above, the direct access to the virtual private network is enabled via the inclusion of a private network SIM card 350 being installed within the private network device 340. The provision of the private network SIM card 350 to the private network device 340 essentially equips the private network device 340 to act as an instance of a private network radio 310. The operator of the virtual private network may control issuance of the private network SIM card 350 to subscribers of the virtual private network or priority access network.

Similar to a VMNO, the operator of the virtual private network or priority access network may have an agreement with the operator of the ATG network 100 to receive bulk access to the ATG network 100, but may service the customers of the virtual private network separate from the servicing of the other customers of the ATG network 100 (i.e., those with ATG SIM cards). In some examples, the aircraft 150, 151 or 152 may be served entirely by a single beam (except during handovers). In such examples, the single beam may have a link budget that is allocated between the ATG network links 210 and the private network links 300 for each respective aircraft 150, 151 and 152. Thus, for example, the virtual private network may have a guaranteed allocation of between 5% and 40% of the link budget. All users of the ATG network link 210 may split (by any suitable allocation method) the portion of the link budget associated with the beam that is provided for distribution via the CWAP 220. As noted above, this could include a large number of "retail" users in the form of passenger and crew devices. Meanwhile, the private network links 300 may be expected to be split among a much smaller number of users. Thus, even in a case where 5% or 10% of the link budget is allocated to the private network links 300, the amount of bandwidth guaranteed to each user on the virtual private network may not only be higher, but may also be consistent.

In some embodiments, separate beams may be associated with the ATG network links 210 and the private network links 300 for each respective aircraft 150, 151 and 152. In these cases also, although the overall link budgets allocated to the respective links may be larger (due to lack of division of such budgets between the virtual private network and other users), it is still likely the case that the per user link budget for the ATG network links 210 can end up being smaller and variable to a larger degree than the individual allocations associated with the private network links 300. Accordingly, the virtual private network may again be capable of providing quality of service and bandwidth guarantees that cannot otherwise be provided by the ATG network links 210. High priority services may therefore advantageously be provided via the virtual private network.

In accordance with one example embodiment, an aviation-related communication network (e.g., an ATG network, a satellite network or a hybrid network) may be provided. The aviation-related communication network may include a plurality of base stations configured to communicate with in-flight aircraft, a plurality of aviation-related communication network radios disposed on selected aircraft where the aviation-related communication network radios are configured to communicate with base stations of the aviation-related communication network via aviation-related communication network (or first/primary/main network) communication links using a first communication standard, and a first wireless access point on each of the selected aircraft to define a first wireless local area network on each of the selected aircraft. At least some of the selected aircraft include a second wireless local area network that defines a priority access network. Devices of the priority access network may be provided with priority access to bandwidth supplied by the aviation-related communication network relative to devices of the first wireless local area network.

In some embodiments, the network described above may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. For example, in some cases, the first wireless access point serves both the first wireless local area network and the priority access network. In some embodiments, a plurality of priority access network radios disposed on at least some of the selected aircraft. The priority access network radios are configured to communicate with the base stations of the aviation-related communication network via priority access network links that also use the first communication standard. In an example embodiment, the aviation-related communication network radios may be provisioned with aviation-related communication network SIM cards associated with a first network operator of the aviation-related communication network, and the priority access network radios may be provisioned with priority access network SIM cards associated with a second network operator to define a virtual private network or priority access network that uses resources of the aviation-related communication network. In some embodiments, the base stations may be configured to communicate with each of the selected aircraft via a respective instance of a focused beam having a defined bandwidth. In an example embodiment, a first portion of the defined bandwidth may be allocated to the aviation-related communication network communication links and a second portion of the defined bandwidth may be allocated to the priority access network links. In some cases, the first portion may be divided among passenger and/or crew devices, and the second portion may be divided among subscribers of the virtual private or priority access network. In an example embodiment, the defined bandwidth for a given aircraft may be associated with a corresponding aviation-related communication network communication link of the given aircraft. A second focused beam may have a second defined bandwidth to define a corresponding private or priority access network link for the given aircraft to serve subscribers of the priority access network. In some cases, a given aircraft includes at least one aviation-related communication network radio and at least one priority access network radio. The at least one aviation-related communication network radio may be operably coupled to a first wireless access point providing short range wireless connectivity to the aviation-related communication network for a plurality of passenger or crew devices. The at least one priority access network radio may be operably coupled to a second wireless access point providing short range wireless connectivity to the aviation-related communication network for a plurality of devices of subscribers of the priority access network. In an example embodiment, only the at least one priority access network radio may include the priority access network SIM card, and only the at least one aviation-related communication network radio may include the aviation-related communication network SIM card such that none of the passenger or crew devices and the devices of the subscribers of the priority access network include either aviation-related communication network SIM cards or priority access network SIM cards. The first and second wireless access points communicate using a second communication standard (e.g., Wi-Fi), which may be different than the first communication standard (e.g., 4G LTE). In some cases, a given aircraft may include at least one aviation-related communication network radio and a first priority access network radio. The at least one aviation-related communication network radio may be operably coupled to a first wireless access point providing short range wireless connectivity to the aviation-related communication network for a plurality of passenger or crew devices. The first priority access network radio may be operably coupled to a second wireless access point providing short range wireless connectivity to the ATG network for a plurality of devices of subscribers of the priority access network. At least one subscriber device of the priority access network may include a second priority access network radio. In an example embodiment, both the first priority access network radio and the second priority access network radio may include respective instances of the priority access network SIM card, and only the at least one aviation-related communication network radio may include the aviation-related communication network SIM card. In some cases, a given aircraft may include at least one aviation-related communication network radio and at least one priority access network device associated with a subscriber of the priority access network. The at least one aviation-related communication network radio may be operably coupled to a first wireless access point providing short range wireless connectivity to the aviation-related communication network for a plurality of passenger or crew devices. The at least one priority access network device may include a priority access network radio.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aviation-related communication network comprising:
   a plurality of base stations configured to communicate with in-flight aircraft;
   a plurality of aviation-related communication network radios disposed on selected aircraft, the aviation-related communication network radios being configured to communicate with base stations of the aviation-related communication network via aviation-related communication network communication links using a first communication standard; and
   a first wireless access point on each of the selected aircraft to define a first wireless local area network on each of the selected aircraft,
   wherein at least some of the selected aircraft include a second wireless local area network that defines a priority access network, devices of the priority access network being provided with priority access to bandwidth supplied by the aviation-related communication network relative to devices of the first wireless local area network,
   the aviation-related communication network further comprising a plurality of priority access network radios disposed on at least some of the selected aircraft, the priority access network radios being configured to communicate with the base stations of the aviation-related communication network via priority access network links that also use the first communication standard.

2. The aviation-related communication network of claim 1, wherein the first wireless access point serves both the first wireless local area network and the priority access network.

3. The aviation-related communication network of claim 1, wherein the aviation-related communication network radios are provisioned with aviation-related communication network subscriber identity module (SIM) cards associated with a first network operator of the aviation-related communication network, and
   wherein the priority access network radios are provisioned with priority access network SIM cards associated with a second network operator associated with the priority access network that uses resources of the aviation-related communication network.

4. The aviation-related communication network of claim 3, wherein the base stations communicate with each of the selected aircraft via a respective instance of a focused beam having a defined bandwidth.

5. The aviation-related communication network of claim 4, wherein a first portion of the defined bandwidth is allocated to the aviation-related communication network communication links and a second portion of the defined bandwidth is allocated to the priority access network links.

6. The aviation-related communication network of claim 5, wherein the first portion is divided among passenger and/or crew devices, and the second portion is divided among subscribers of the priority access network.

7. The aviation-related communication network of claim 4, wherein the defined bandwidth for a given aircraft is associated with a corresponding aviation-related communication network communication link of the given aircraft, and
   wherein a second focused beam having a second defined bandwidth defines a corresponding priority access network link for the given aircraft to serve subscribers of the priority access network.

8. The aviation-related communication network of claim 3, wherein a given aircraft includes at least one aviation-related communication network radio and at least one priority access network radio,
   wherein the at least one aviation-related communication network radio is operably coupled to a first wireless access point providing short range wireless connectivity to the aviation-related communication network for a plurality of passenger or crew devices, and
   wherein the at least one priority access network radio is operably coupled to a second wireless access point providing short range wireless connectivity to the aviation-related communication network for a plurality of devices of subscribers of the priority access network.

9. The aviation-related communication network of claim 8, wherein only the at least one priority access network radio includes the priority access network SIM card, and only the at least one aviation-related communication network radio includes the aviation-related communication network SIM card such that none of the passenger or crew devices and the devices of the subscribers of the priority access network include either aviation-related communication network SIM cards or priority access network SIM cards, and
   wherein the first and second wireless access points communicate using a second communication standard.

10. The aviation-related communication network of claim 3, wherein a given aircraft includes at least one aviation-related communication network radio and a first priority access network radio,
    wherein the at least one aviation-related communication network radio is operably coupled to a first wireless access point providing short range wireless connectivity to the aviation-related communication network for a plurality of passenger or crew devices,
    wherein the first priority access network radio is operably coupled to a second wireless access point providing short range wireless connectivity to the aviation-related communication network for a plurality of devices of subscribers of the priority access network, and
    wherein at least one subscriber device of the priority access network includes a second priority access network radio.

11. The aviation-related communication network of claim 10, wherein both the first priority access network radio and the second priority access network radio include respective instances of the priority access network SIM card, and only the at least one aviation-related communication network radio includes the aviation-related communication network SIM card.

12. The aviation-related communication network of claim 3, wherein a given aircraft includes at least one aviation-related communication network radio and at least one priority access network device associated with a subscriber of the priority access network, wherein the at least one aviation-related communication network radio is operably coupled to a first wireless access point providing short range wireless connectivity to the aviation-related communication network for a plurality of passenger or crew devices, and wherein the at least one priority access network device includes a priority access network radio.

13. The aviation-related communication network of claim 3, wherein a given aircraft includes at least one aviation-related communication network radio and at least one priority access network radio, wherein the at least one aviation-related communication network radio is operably coupled to a first wireless access point providing short range wireless connectivity to the aviation-related communication network for a plurality of passenger or crew devices, and wherein the at least one priority access network radio is operably coupled to a second wireless access point providing short range wireless connectivity to the aviation-related communication network for a plurality of avionics-related devices of the aircraft to define an internet-of-things environment on the aircraft with priority access to resources of the aviation-related communication network.

14. A priority access network operable on an aircraft separate from, but using resources of, an aviation-related communication network, the aviation-related communication network comprising a plurality of base stations configured to communicate with in-flight aircraft including the aircraft, and a plurality of aviation-related communication network radios disposed on selected aircraft including the aircraft, the aviation-related communication network radios being configured to communicate with base stations of the aviation-related communication network via aviation-related communication network communication links using a first communication standard, the aviation-related communication network radios further being configured to interface with devices forming a first wireless local area network on the aircraft bandwidth supplied by the aviation-related communication network wherein the priority access network comprises a first wireless access point and a plurality of devices configured to define a second wireless local area network on the aircraft, wherein the devices of the priority access network have priority access to the bandwidth supplied by the aviation-related communication network relative to devices of the first wireless local area network, and wherein a priority access network radio is disposed on the aircraft, and wherein the priority access network radio is configured to communicate with the base stations of the aviation-related communication network via priority access network links that also use the first communication standard.

15. The priority access network of claim 14, wherein the first wireless access point serves both the first wireless local area network and the priority access network.

16. The priority access network of claim 14, wherein the aviation-related communication network radios are provisioned with aviation-related communication network subscriber identity module (SIM) cards associated with a first network operator of the aviation-related communication network, and wherein the priority access network radios are provisioned with priority access network SIM cards associated with a second network operator to define the priority access network.

17. The priority access network of claim 14, wherein the aircraft includes at least one aviation-related communication network radio and at least one priority access network radio, wherein the at least one aviation-related communication network radio is operably coupled to a first wireless access point providing short range wireless connectivity to the aviation-related communication network for a plurality of passenger or crew devices, and wherein the at least one priority access network radio is operably coupled to a second wireless access point providing short range wireless connectivity to the priority access network for a plurality of devices of subscribers of the priority access network.

18. The priority access network of claim 14, wherein the aircraft includes at least one aviation-related communication network radio and a first priority access network radio, wherein the at least one aviation-related communication network radio is operably coupled to a first wireless access point providing short range wireless connectivity to the aviation-related communication network for a plurality of passenger or crew devices, wherein the first priority access network radio is operably coupled to a second wireless access point providing short range wireless connectivity to the aviation-related communication network for a plurality of devices of subscribers of the priority access network, and wherein at least one subscriber device of the priority access network includes a second priority access network radio.

\* \* \* \* \*